United States Patent [19]

Morita et al.

[11] 4,384,270
[45] May 17, 1983

[54] TURN INDICATOR SYSTEM FOR USE IN AUTOMOBILES

[75] Inventors: Masayuki Morita, Tokoname; Tasuku Nakano, Mizunami, both of Japan

[73] Assignee: Kabushiki Kaisha Tokai Rika Denki Seisakusho, Aichi, Japan

[21] Appl. No.: 211,718

[22] Filed: Dec. 1, 1980

[30] Foreign Application Priority Data

Nov. 30, 1979 [JP] Japan .......................... 54/165065[U]

[51] Int. Cl.³ ............................................. B60Q 1/00
[52] U.S. Cl. .................................. 340/73; 200/61.27; 200/61.3; 200/61.35
[58] Field of Search ............................ 340/73, 55, 56; 200/61.27, 61.3, 61.35

[56] References Cited

U.S. PATENT DOCUMENTS

| 3,914,737 | 10/1975 | Sato | 340/73 |
| 4,264,891 | 4/1981 | Bergmann et al. | 340/73 |
| 4,323,877 | 4/1982 | Morita et al. | 340/73 |

Primary Examiner—Donald J. Yusko
Attorney, Agent, or Firm—Wenderoth, Lind & Ponack

[57] ABSTRACT

A turn indicator system for use in an automobile includes two sets of switches disposed around a steering wheel shaft for detecting, respectively, opposite directions of rotation of the steering wheel. The cancellation of an actuated turn indicator is carried out when the steering wheel, which has been rotated in one direction from its neutral position, is returned towards the neutral position.

11 Claims, 19 Drawing Figures

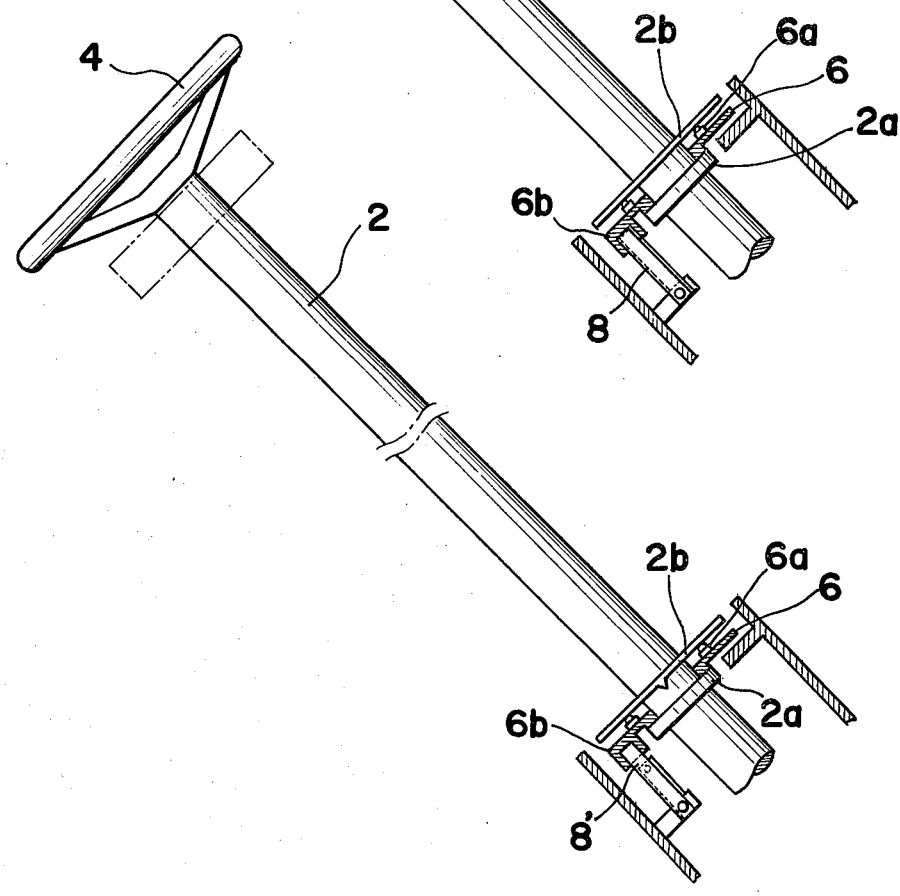

TURN INDICATOR SYSTEM FOR USE IN AUTOMOBILES

BACKGROUND OF THE INVENTION

The present invention relates to a turn indicator system for use in automobiles.

Generally, an automobile has a turn indicator system including a turn indicator lever provided at a position within reach of a driver and adjacent, for example, a steering wheel, for tilting or pivotal movement in a clockwise or counterclockwise direction from a neutral position, a switch unit provided in association with the turn indicator lever, and right and left indicator lamps, the right indicator lamp or lamps being actuated to blink when the turn indicator lever is tilted clockwise, and the left indicator lamp or lamps being actuated to blink when the turn indicator lever is tilted counterclockwise.

The turn indicator system of the above described typical arrangement further includes an automatic cancellation mechanism provided in association with the steering wheel to automatically turn the tilted indicator lever to the neutral position after the completion of turning movement of the automobile.

According to the prior art turn indicator system, the automatic cancellation mechanism returns the turn indicator lever to the neutral position when the steering wheel is turned in a direction opposite to the direction in which the indicator lever has been tilted. (It is to be noted that the direction of rotation of the steering wheel in the direction in which the indicator lever is tilted will hereinafter be referred to as "indicated direction" and that the term "counterindicated direction" herein used is to be understood as meaning the direction opposite to the indicated direction.) For example, when the turn indicator lever is tilted clockwise, it is held in the tilted position during the clockwise rotation of the steering wheel, but is returned to the neutral position by the automatic cancellation mechanism when the steering wheel is turned counterclockwise.

In the prior art turn indicator system of the type described above, there is such a disadvantage that the turn indicator lever will unnecessarily be returned to the neutral position when the steering wheel is turned a slight angle in the counterindicated direction, i.e., a direction opposite to the direction of turn of the automobile, before the steering wheel is completely in the direction of turn of the automobile, that is, before the automobile completes the turn in the intended direction. By way of example, assuming that the driver has tilted the indicator lever clockwise in an attempt to turn the automobile rightwards and the rightward turn indicator lamp has accordingly been actuated to blink, and assuming that the driver who should turn the steering wheel clockwise to turn the automobile rightwards is forced to turn the automobile slightly leftwards for avoiding an obstacle on its way or for some other reason by turning the steering wheel counterclockwise through a slight angle, such a counterclockwise turn of the steering wheel through the slight angle causes the cancellation mechanism to return the once-tilted indicator lever to the neutral position with the result that the rightward turn indicator lamp is consequently deenergized. Accordingly, the driver must again tilt the indicator lever clockwise if and when he wishes to complete the rightward turn of the automobile after having avoided the obstacle.

Furthermore, the size of the turn indicator system of the prior art is considerably large since the arrangement for automatic cancellation is constituted by a mechanical arrangement.

SUMMARY OF THE INVENTION

Accordingly, it is an important object of the present invention to provide a turn indicator system which eliminates the above described disadvantages.

It is also an important object of the present invention to provide a turn indicator system which will not return the turn indicator lever to its neutral position by the first turning operation of the steering wheel in a counterindicated direction.

It is a further important object of the present invention to provide a turn indicator system which will not return the turn indicator lever to its neutral position by the first turning operation of the steering wheel in the counterindicated direction, unless the steering wheel is turned to a considerable degree.

It is another object of the present invention to provide a turn indicator system of the above described type which is simple in construction and which can readily be manufactured at low cost.

In accomplishing these and other objects, a turn indicator system according to the present invention comprises a plate member rotatably mounted on, and frictionally engaged to, a steering wheel shaft to cause the plate member to rotate together with the steering wheel shaft, and a contact member rigidly connected to the plate member. First and second stop members are disposed around the steering wheel shaft and spaced a predetermined angle from each other about a longitudinal axis of the steering wheel shaft. The contact member is adapted to come into contact with the first and second stop members when the steering wheel is rotated in first and second directions, respectively. The contact member, when forced to contact any one of the first and second stop members depending on the direction of rotation of the steering wheel shaft, is held stand still in engagement with the corresponding stop member while permitting the continued rotation of the steering wheel shaft. First and second switch means are operatively associated with the first and second stop members, respectively, such that the first and second switch means are actuated by the contact member. The turn indicator system further comprises means for cancelling the first and second turn indicators by the actuation of the second and first switch means, respectively.

BRIEF DESCRIPTION OF THE DRAWINGS

These and other objects and features of the present invention will become apparent from the following description taken in conjunction with preferred embodiments thereof with reference to the accompanying drawings, and in which:

FIGS. 9 and 10 are side views showing modifications of the arrangement of the mechanical portions of the first and second embodiments, respectively.

DETAILED DESCRIPTION OF THE INVENTION

Figure 1:
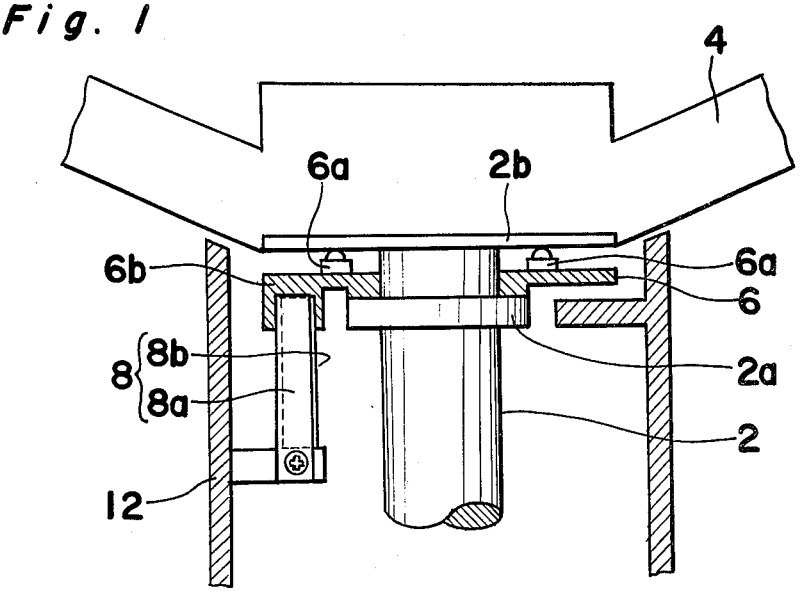
FIG. 1 is a side view, partly broken away, of a mechanical portion of a turn indicator system according to a first embodiment of the present invention.

Before the description of the present invention proceeds, it is to be noted that like parts are designated by like reference numerals throughout the accompanying drawings.

Embodiment 1

A turn indicator system according to the first embodiment of the present invention consists of a mechanical portion described in connection with FIGS. 1 to 2c and an electrical portion described in connection with FIGS. 3 to 5.

Referring particularly to FIG. 1, the mechanical portion of the turn indicator system of this embodiment is provided in association with a steering wheel shaft 2 at a position adjacent to a steering wheel 4, and comprises a ring member 6 rotatably mounted on the shaft 2 between a collar 2a and a plate 2b which are fixedly connected to the shaft 2. The bottom face of the ring member 6 remote from the steering wheel 4 is held in contact with the collar 2a, and the top face of the ring member 6 facing the steering wheel 4 is provided with a plurality of bearing members 6a each having a rounded end touching the plate 2b, and a spring (not shown) incorporated therein for biasing the rounded end against the plate 2b. Accordingly, the ring member 6 is urged against the collar 2a to cause the ring member 6 to rotate together with the shaft 2 by friction between the ring member 6 and the shaft 2 when no obstacle is in its way. The ring member 6 is also provided with a contact 6b radially extending from the perimeter of the ring member 6.

The mechanical portion further comprises two sets of stoppers 8 and 10 which are disposed around the shaft 2 and spaced a predetermined angle, such as 90° from each other about the longitudinal axis of the shaft. The stopper 8 includes two elastic elongated plates 8a and 8b having approximately the same length as each other and each made of electrically conductive material preferably of a metal. Respective ends of the elongated plates 8a and 8b are fixedly connected to a housing 12 of the steering wheel shaft 2 in such a manner that the elongated plates 8a and 8b extend approximately parallel to each other with a predetermined gap held between them and that the free ends of the respective elongated plates 8a and 8b are located at a position capable of receiving the contact 6b, when the ring member 6 is rotated, to stop the rotation of the ring member 6. Since the fixed ends of the elongated plates 8a and 8b are electrically insulated from each other, the stopper 8 constitutes a first normally opened switch. The stopper 10 also has two elongated plates 10a and 10b arranged in a manner similar to those of the stopper 8 to form a second normally opened switch. The movement of the mechanical portion is explained below.

Figure 2A:
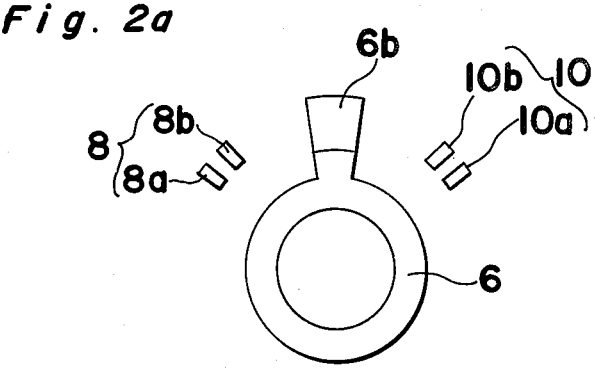
FIGS. 2a, 2b and 2c are diagrammatic views showing the relation between a ring member and stoppers.
Figure 2B:
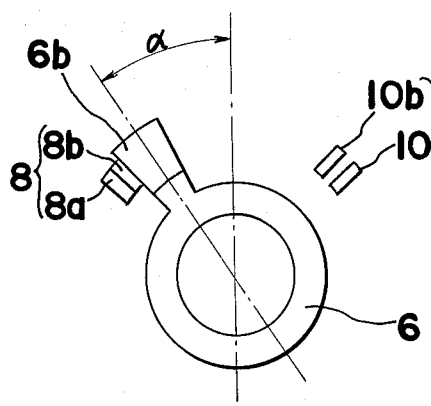
Figure 2C:
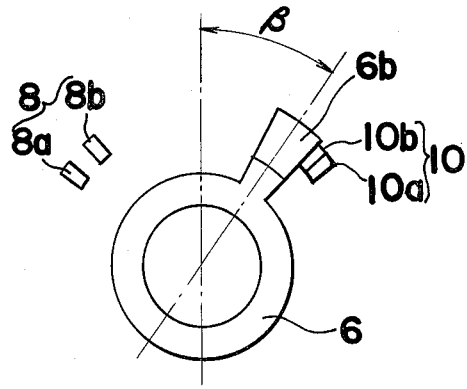

When the steering wheel 4 is so positioned as to align the front wheels (not shown) straightforward, the contact 6b of the ring member 6 is located intermediately between the stoppers 8 and 10, as shown in FIG. 2a. When the steering wheel 4 is turned counterclockwise to make a left turn of the automobile, the steering wheel shaft 2 is subsequently turned to cause the rotation of the ring member 6 together with the shaft 2. When the steering wheel 4 is turned $\alpha$, the contact 6b of the ring member 6 comes into contact with the stopper 8, and pushes the elongated plate 8b towards the other elongated plate 8a, resulting in a contact between the plates 8a and 8b, as best shown in FIG. 2b. Thereafter, regardless of further counterclockwise rotation of the steering wheel 4, the ring member 6 is maintained in the position shown in FIG. 2a. Thus, the plates 8a and 8b are held in the contacted relation with each other until the steering wheel 4 starts to turn clockwise.

Then, when the left turn of the automobile is completed, the steering wheel 4 is turned clockwise to return it to the neutral position, causing the ring member 6 to turn clockwise and, therefore, releasing the elongated plates 8a and 8b from the contacted relation. As a result, the elongated plates 8a and 8b return to their initial position, i.e., separated position, by their own resiliency. When the steering wheel 4 is turned clockwise $\alpha + \beta$, the contact 6b comes into contact with the other stopper member 10 in a manner similar to that described above. Thus, in this case, the elongated plates 10a and 10b are contacted with each other until the front wheels are returned to a straightforward position. When the front wheels are aligned straightforward, the steering wheel 4 tends to rotate slightly counterclockwise within a degree of permissible play by a so-called autocentering system of the steering wheel to stop the contact 6b in its initial position, as shown in FIG. 2a.

As is understood from the foregoing, when making a left turn, the first normally opened switch constituted by the stopper 8 closes at the beginning of turning of the steering wheel 4 counterclockwise, and the second normally opened switch constituted by the stopper 10 closes at the beginning of returning of the steering wheel 4. A similar operation is carried out when making a right turn.

The first and second normally opened switches 8 and 10 are provided in association with the electrical portion described below.

Figure 3:
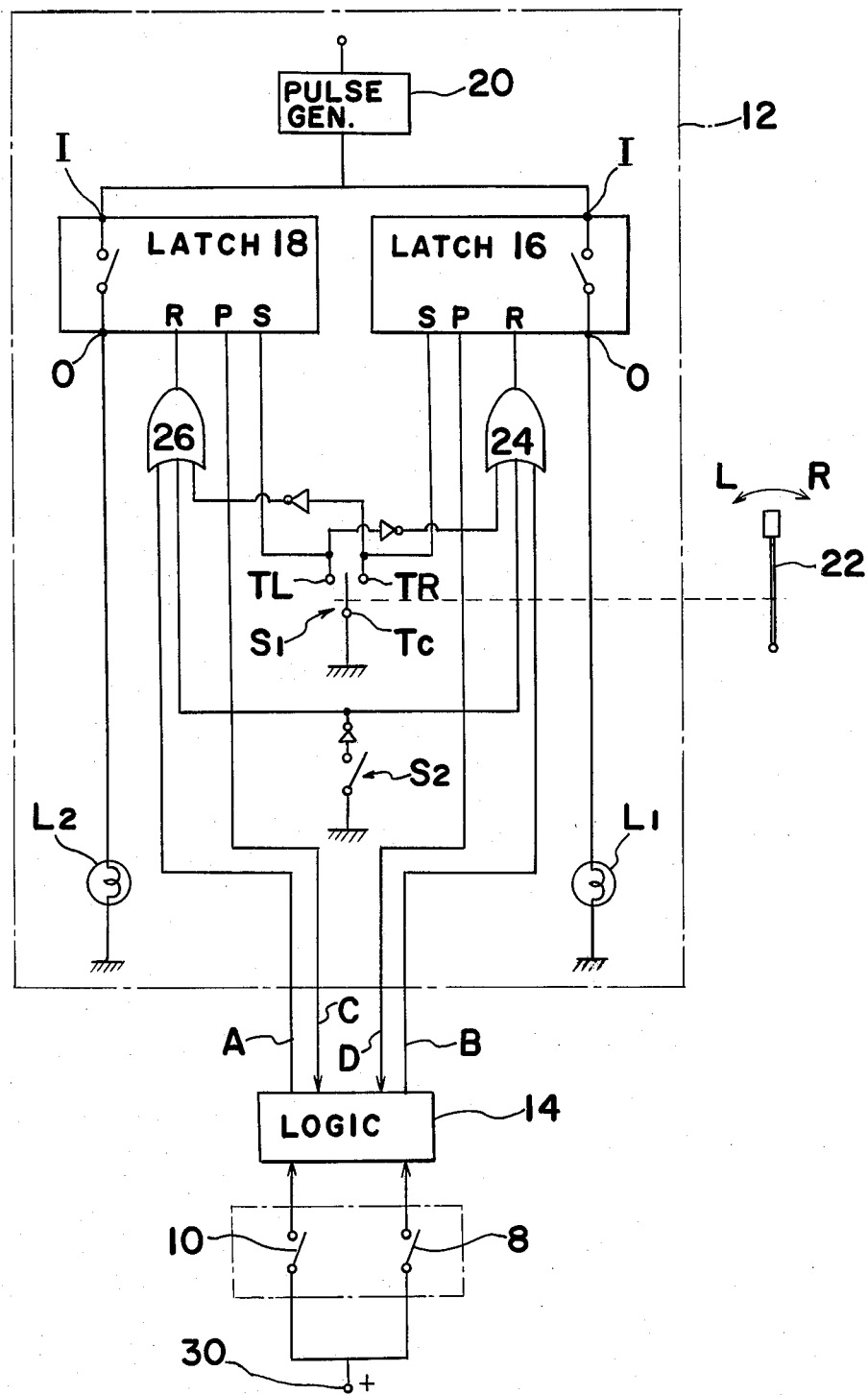
FIG. 3 is a circuit diagram of an electrical portion of a turn indicator system according to the first embodiment of the present invention.

Referring to FIG. 3, the electrical portion comprises a control circuit 12 and a logic circuit 14. The control circuit 12 includes latches 16 and 18 each having input terminal I and output terminal O. The input terminals I of the respective latches 16 and 18 are connected to a pulse generator 20, and the output terminals O are connected to right and left indicator lamps L1 and L2, respectively. Each of the latches 16 and 18 further has a set terminal S which receives a negative going pulse for establishing an electrical connection between the input and output terminals I and O, a terminal P which produces a high level signal when the electrical connection between the input and output terminals I and O is established, and a reset terminal R which receives a high level signal for disconnecting the terminals I and O.

A turn indicator switch S1 provided in association with a turn indicator lever 22 has three terminals TR, TL and TC in which the terminals TR and TL are connected, respectively, directly to set terminals S of the latches 16 and 18, and the terminal TC is connected to ground. When the turn indicator lever 22 is tilted rightwardly, the terminals TC and TR of the turn indicator switch S1 are connected with each other, and when it is tilted leftwardly, the terminals TC and TL are connected with each other.

Connected to the reset terminal R of the latch 16 is an OR gate 24 having three inputs which are respectively connected to the terminal TL of the turn indicator switch S1 through an inverter, a cancellation switch S2 through an inverter, and the logic circuit 14 through a lead line B. Similarly, the reset terminal R of the latch 18 is connected to an OR gate 26 having three inputs which are connected respectively to the terminal TR of the turn indicator switch S1 through an inverter, the cancellation switch S2 through the inverter, and the logic circuit 14 through a lead line A. The operation of the control circuit 12 of FIG. 3 is explained below.

When the turn indicator lever 22 is tilted, for example, rightwardly, a negative going pulse is applied to the set terminal S of the latch 16 for connecting the input and output terminals I and O of the latch 16 to supply a train of pulse signals to the right indicator lamp L1 and, therefore the right indicator lamp L1 subsequently blinks. During the blinking of the right indicator lamp L1, a high level signal is produced from the terminal P of the latch 16, and it is applied through a lead line D to the logic circuit 14 for the indication that the right indicator lamp L1 is blinking. It is to be noted that when the left indicator lamp L2 is on, a high level signal is produced from the terminal P of the latch 18, and it is applied through a lead line C to the logic circuit 14.

The cancellation of the right turn indication can be carried out manually by turning on the cancellation switch S2 or by tilting the turn indicator lever 22 leftwardly, or automatically by the logic circuit 14 after the right turn of the automobile is completed. It is to be noted that a similar operation is carried out for the left turn indication. Next, the logic circuit 14 is explained.

Figure 4:
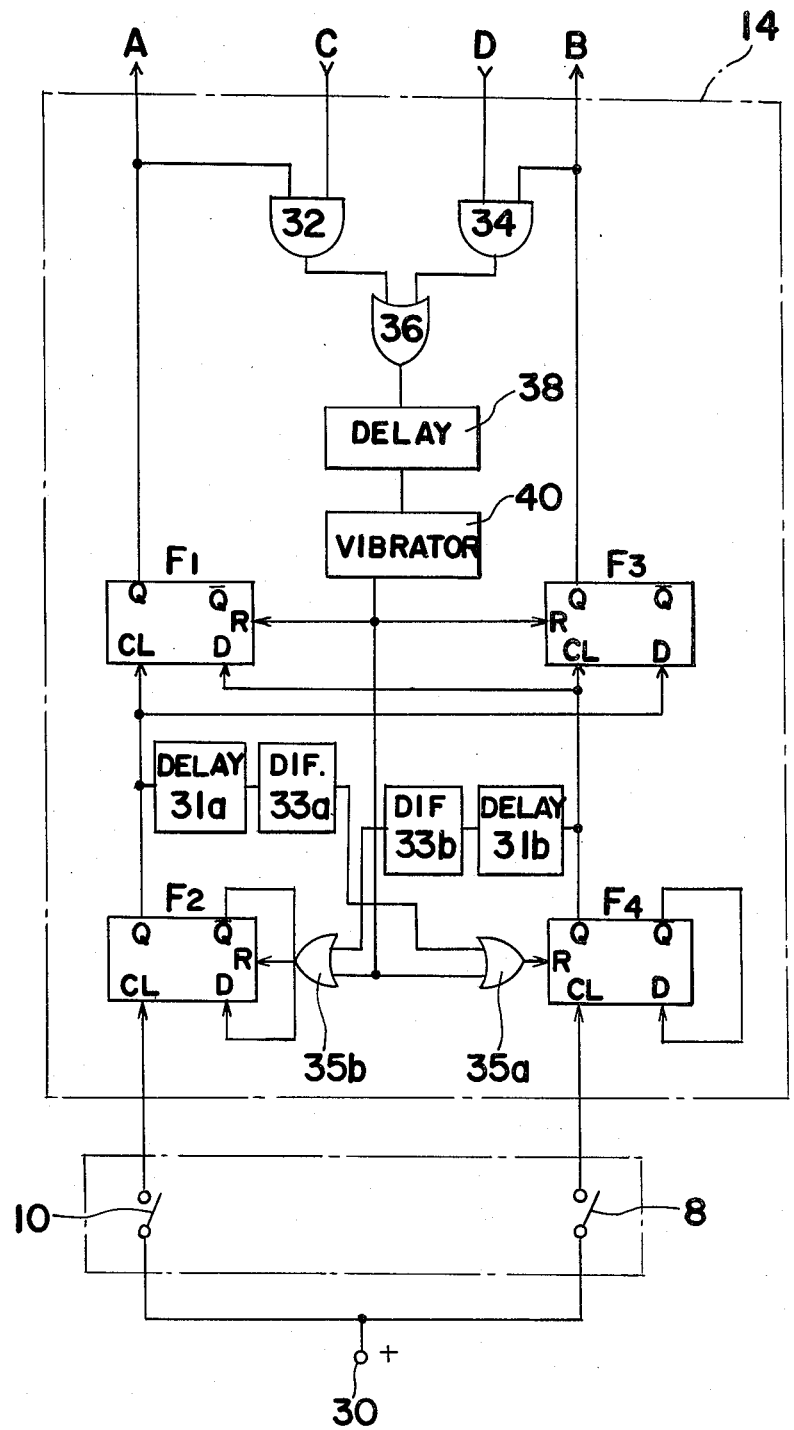
FIG. 4 is a circuit diagram showing a detail of a logic circuit employed in the circuit of FIG. 3.

Referring to FIG. 4, the logic circuit 14 comprises four D flip-flops F1, F2, F3 and F4, each having output terminals Q and $\overline{Q}$ which produce low and high level signals, respectively, when the flip-flop is in a reset condition, clock terminal CL, data terminal D and reset terminal R, and operating in such a manner that when a pulse is applied to the clock terminal CL, a signal receiving at the data terminal D is transferred to output terminal Q. The clock terminal CL of the D flip-flop F4 is connected through the switch 8 to a terminal 30 carrying a positive potential. Likewise, the clock terminal CL of the D flip-flop F2 is connected through the switch 10 to the terminal 30. Each of the flip-flops F2 and F4 has its output terminal $\overline{Q}$ connected to its data terminal D for applying, when the flip-flop is in the reset condition, a high level signal to the data terminal D. The output terminal Q of the flip-flop F2 is connected to clock terminal CL of the flip-flop F1 and also to the data input terminal D of the flip-flop F3. The output terminal Q of the flip-flop F2 is further connected through a delay circuit 31a, a differential circuit 33a, and an OR gate 35a to the reset terminal R of the flip-flop F4. Similarly, the output terminal Q of the flip-flop F4 is connected to the clock terminal CL of the flip-flop F3, the data input terminal D of the flip-flop F1, and also to the reset terminal R of the flip-flop F2 through delay circuit 31b, a differential circuit 33b and an OR gate 35b. The output terminal Q of the flip-flop F1 is connected to the lead line A and the output terminal Q of the flip-flop F3 is connected to the lead line B.

The lead line A and the lead line C extending from the P terminal of the latch 18 (FIG. 3) are connected to an AND gate 32. Similarly, the lead lines B and D are connected to an AND gate 34. The outputs from the respective AND gates 32 and 34 are connected to an OR gate 36 which is further connected to a delay circuit 38. The delay circuit 38 delays the output signal from the OR gate 36 a predetermined period of time, such as 1 ms. The delay circuit 38 is connected to a multivibrator 40 which is further connected directly to a reset terminal R of each of the D flip-flop circuits F1 and F3, and also to a reset terminal R of each of the D flip-flop circuits F2 and F4 through OR gates 35b and 35a, respectively. The operation of the logic circuit is explained below.

When the turn indicator lever 22 is tilted, for example, rightwardly to make a right turn, the lead line D carries a high level signal in the manner described above. Then, during the steering wheel 4 being turned rightwards, i.e., counterclockwise, the switch 10 is turned on and, then, during the steering wheel 4 being returned back clockwise, the switch 8 is turned on. When the switch 10 is turned on, the positive potential at the terminal 30 is applied to the clock terminal CL of the flip-flop F2. Accordingly, the flip-flop F2 is so actuated as to transmit a signal (high level signal) at its data input terminal D to its output terminal Q. The high level signal from the output terminal Q of the flip-flop F2 is applied to the data input terminal D of the flip-flop F3 and also to the clock terminal CL of the flip-flop F1. Since the data input terminal D of the flip-flop F1 is receiving a low level signal from the flip-flop F4, the output terminal Q of the flip-flop F1 produces a low level signal. Therefore, no cancellation signal will be produced along the line A. Then, when the switch 8 is turned on, the flip-flop F4 is so actuated as to produce from its output terminal Q a high level signal which is applied to the clock terminal CL of the flip-flop F3. Since the data input terminal D of the flip-flop F3 is now receiving a high level signal from the flip-flop F2, the output terminal Q of the flip-flop F3 produces a high level signal along the lead line B. Accordingly, a high level signal is applied to the reset terminal R of the latch 16 to disconnect the input and output terminals I and O of the same and, therefore, the cancellation of blinking of the right indication lamp L1 is effected.

The high level signal on the lead line B is also applied to the AND gate 34 which then applied a high level signal through the OR gate 36 to the delay circuit 38. A pulse produced from the delay circuit 38 is reformed in the monostable multivibrator 40 and is applied to the reset terminal R of the flip-flop circuits F1, F3 and F4. It is to be noted that the flip-flop F2 is already reset by the high level signal applied thereto from the terminal Q of the flip-flop F4 through the delay circuit 31b and differential circuit 33b. when the flip-flop is reset, its output terminals Q and $\overline{Q}$ produces low and high level signals, respectively. Thus, the logic circuit 14 is ready for the next operation.

The operation of the logic circuit 14 explained above is the case when the steering wheel 4 is turned first to the indicated direction and, then, to the counterindicated direction. Next, the operation of the logic circuit 14 for the case when the steering wheel 4 is first turned to the counterindicated direction, then the indicated direction, and then the counterindicated direction is explained.

When the indicated direction is right, and when the steering wheel 4 is turned first to counterclockwise, then clockwise and, then, counterclockwise, the switches 8 and 10 are turned on in sequence of switch 8, switch 10 and switch 8. When the switch 8 is turned on for the first time, the flip-flop F4 is so actuated as to produce a high level signal from its output terminal Q providing a high level signal to the data input terminal D of the flip-flop F1. Then, when the switch 10 is turned on, the flip-flop F2 is so actuated as to produce from its output terminal Q a high level signal which is applied to the clock terminal CL of the flip-flop F1. Since the data input terminal D of the flip-flop F1 is now receiving a high level signal from the terminal Q of the flip-flop F4, the flip-flop F1 produces a high level signal along the lead line A. However, since the left indicator lamp L2 has not been blinking, the high level signal from the terminal Q of the flip-flop F1 will not actuate the control circuit 12 in any manner. Furthermore, since the lead line C is carrying a low level signal, no high level signal will be produced from the AND gate 32 by the high level signal from the terminal Q of the flip-flop F1. The high level signal from the terminal Q of the flip-flop F2 is also applied to the data input terminal D of the flip-flop F3, and to the reset terminal R of the flip-flop F4 through the delay circuit 31a and differential circuit 33a for the reset of the flip-flop F4. Finally, when the switch 8 is turned on for the second time, a high level signal will be produced from the terminal Q of the flip-flop F4. The produced high level signal is applied to the clock terminal CL of the flip-flop F3 for producing a high level signal from the terminal Q of the flip-flop F3 along the lead line B. The high level signal carried by the lead line B cancels the blinking of the right indication lamp L1 and, at the same time, resets the flip-flops F1, F3 and F4 by the signal from the vibrator 40 and flip-flop F2 by the signal from the differential circuit 33b in a similar manner described above.

Figure 5:
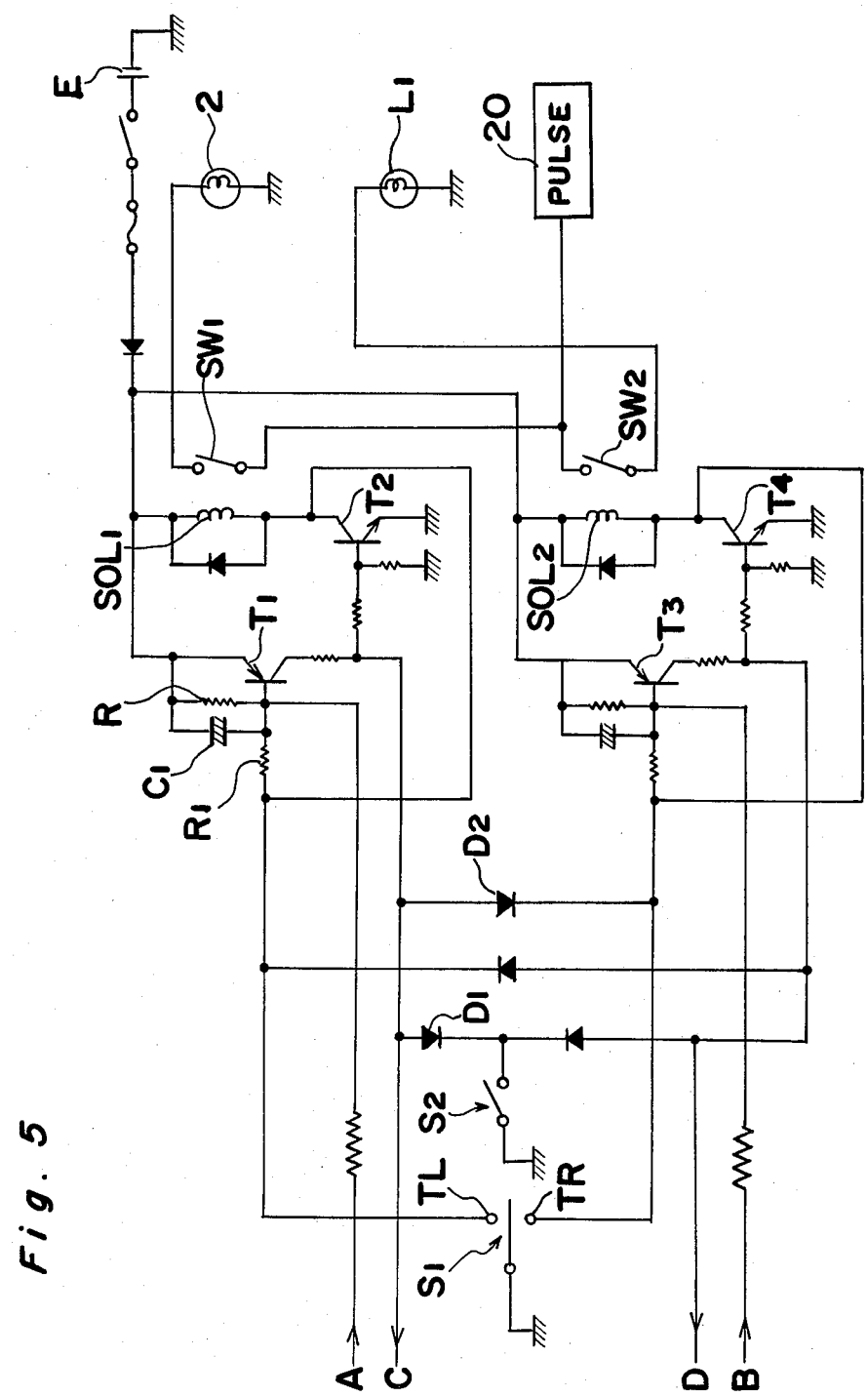
FIG. 5 is a circuit diagram showing a detail of a control circuit employed in the circuit of FIG. 3.

Referring to FIG. 5, there is shown a detailed circuit diagram for the control circuit 12. The control circuit 12 comprises a left indication lamp control circuit and a right indication lamp control circuit. The left indication lamp control circuit includes transistors T1 and T2 and a solenoid coil SOL1 which is coupled with a switch SW1. The base of the transistor T1 is connected to the lead line A through a suitable resistor, the terminal TL of the turn indicator switch S1 through a resistor R1, and also to its emitter through a resistor R2. A capacitor C1 is connected parallelly to the resistor R2. The emitter of the transistor T1 is connected to a source of electric power E, and the collector of the same is connected through a suitable resistor to the base of the transistor T2, and also to the ground. The collector of the transistor T1 is further connected with the lead line C. The collector of the transistor T2 is connected to the terminal TL of the turn indicator switch S1, and also to the solenoid coil SOL1 which is, in turn, connected to the power source E. The emitter of the transistor T2 is connected to ground. The pulse generator 20 is connected to the lamp L2 through the switch SW1. The lead line C is connected to the cancellation switch S2 through a diode D1, and also to the terminal TR of the turn indicator switch S1 through a diode D2.

The right indication lamp control circuit includes transistors T3 and T4 and a solenoid coil SOL2 which are connected in a manner similar to those of the left indication lamp control circuit. The operation of the control circuit 12 is explained below.

When the turn indicator lever 22 is tilted, for example, leftwardly, the terminal TL of the turn indicator switch S1 is grounded to connect the solenoid coil SOL1 ground and, therefore, the solenoid coil SOL1 is energized to turn on the switch SW1 causing the lamp L2 to blink. Once the terminal TL is thus grounded, the transistor T1 conducts to allow current to flow therethrough to the ground resulting in application of high voltage to the base of transistor T2. Thus, the transistor T2 conducts to allow the current from the solenoid coil SOL1, and also from the emitter of the transistor T1 through the resistors R2 and R1 to path therethrough. The current that flows through the resistors R2 and R1 and the transistor T2 to the ground provides a biasing voltage to the base of the transistor T1 to maintain the transistor T1 conductive, thus maintaining the transistor T2 conductive. Therefore, once the terminal TL of the turn indicator switch S1 is grounded, the transistors T1 and T2 are maintained in a conductive state even if the terminal TL is disconnected from the ground. During the period transistors T1 and T2 are conductive, the lamp L2 keeps on blinking and, at the same time, the lead line C carries a high level signal. The return of the transistors T1 and T2 to non-conductive is carried out by the closure of the cancellation switch S2 or by the turning of the turn indicator switch S1 in such a manner as to connect the terminal TR with ground, so as to provide a low level signal to the base of the transistor T2, or by the application of high level signal to the base of the transistor T1 from the logic circuit 14 through the lead line A.

A similar operation is carried out for blinking and cancelling the right indication lamp L1.

According to the first embodiment of the present invention, the turn indicator lamp will not be canceled by the rotation of steering wheel 4 in the counterindicated direction unless the steering wheel 4 is once rotated in the indicated direction.

Embodiment 2

A turn indicator system according to the second embodiment of the present invention also consists of a mechanical portion described in connection with FIGS. 6 and 7, and an electrical portion described in connection with FIG. 8.

Since the mechanical portion of the second embodiment differs from that of the first embodiment with respect to a few features, the difference is described.

Figure 6:
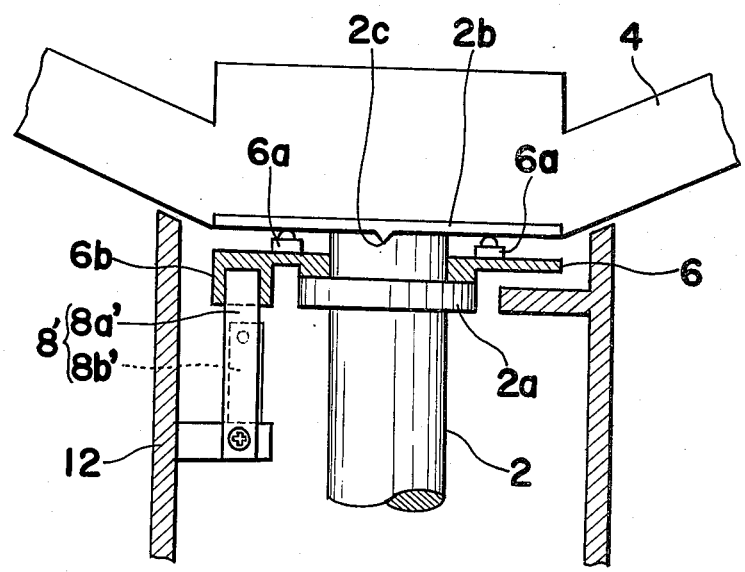
FIG. 6 is a side view, partly broken away, of a mechanical portion of a turn indicator system according to a second embodiment of the present invention.

Referring to FIG. 6, the plate 2b fixedly connected to the shaft 2 has an engaging projection 2c having a V-shape cross-section and extending radially outwardly from the shaft 2 along a diameter of the plate 2b. Although the stopper 8 of the first embodiment is constituted by a pair of elastic plates 8a and 8b having approximately the same length as each other, a stopper 8' of the second embodiment is constituted by a pair of elastic plates 8a' and 8b' with the length of the elastic plate 8b' being shorter than that of the elastic plate 8a'. Furthermore, since the elastic plate 8b' is normally held in contact with the elastic plate 8a', the stopper 8' constitutes a normally closed switch. Another stopper 10' constituted by a pair of elastic plates 10a' and 10b' has the same structure as the stopper 8'. The movement of the mechanical portion is explained below.

Figure 7A:
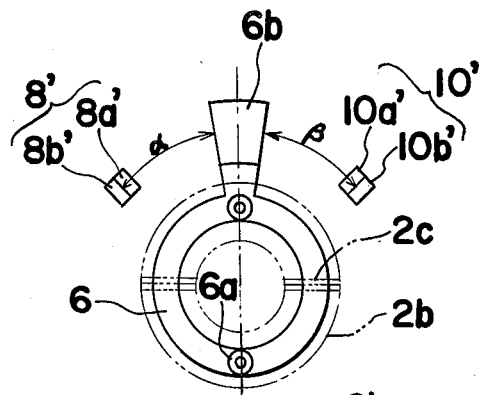
FIGS. 7a to 7h are diagrammatic views showing the relation between a ring member and stoppers.
Figure 7B:
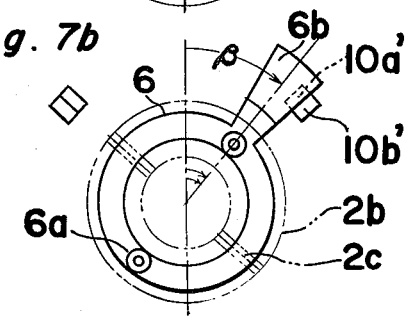
Figure 7C:
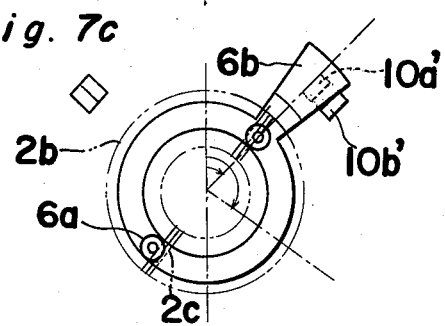
Figure 7D:
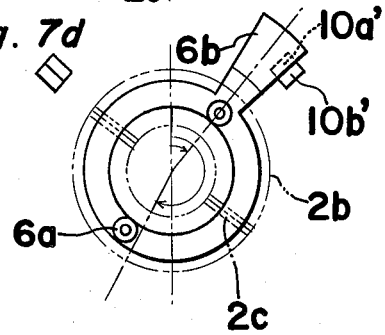
Figure 7E:
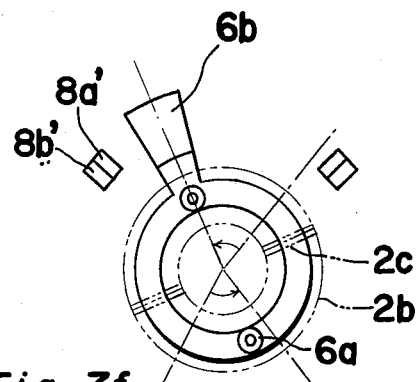

When the steering wheel 4 is so positioned as to align the front wheels (not shown) straightforward, the contact 6b of the ring member 6 is located intermediately between the stoppers 8' and 10', as shown in FIG. 7a. Since the plate 2b is integrally formed with the steering wheel 4, the rotated position of the plate 2b shown in FIGS. 7a to 7h is understood to be representative of the rotated position of the steering wheel 4. When the steering wheel 4 is turned clockwise to make a right turn of the automobile, the steering shaft 2 is subsequently turned to cause the rotation of the ring member 6 together with the shaft 2. When the steering wheel 4 is turned β, as shown in FIG. 7b, the contact 6b of the ring member 6 comes into contact with the longer elastic plate 10b' of the stopper 10'. Since the elastic plate 10b' is relatively stiff when compared with the elastic plates 10a and 10b of the first embodiment, a further clockwise rotation of the steering wheel 4 will not push the elastic plate 10b' apart from the shorter elastic plate 10a', but maintains the ring member 6 in a β-turned position with the elastic plates 10a' and 10b' being held in the contacting condition. When the steering wheel 4 is turned clockwise approximately 135°, as shown in FIG. 7c, the engaging projection 2c comes into contact with the bearing member 6a for providing a further clockwise rotational force to the ring member 6 to push the longer elongated plate 10b' apart from the shorter elongated plate 10a'. A further clockwise rotation of the steering wheel 4 causes the engaging projection 2c to push down the rounded end of the bearing member 6a to allow the engaging projection 2c to slidingly move past the bearing member 6a. Thereafter, the ring member 6 remains in the engaged position with the longer elastic plate 10b' of the stopper 10', regardless of further rotation of the steering wheel 4, as shown in FIG. 7d.

Figure 7F:
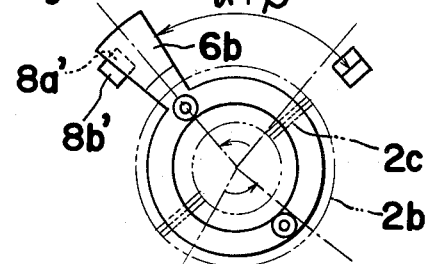
Figure 7G:
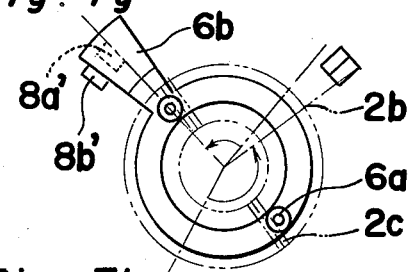
Figure 7H:
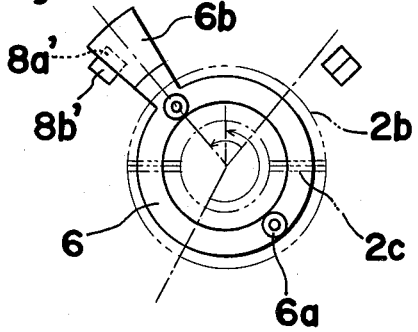

Assuming that the right turn of the automobile is completed when the steering wheel 4 is rotated to the position shown in FIG. 7d, now it is necessary to turn the steering wheel 4 counterclockwise. When the steering wheel 4 is turned α+β counterclockwise from the position shown in FIG. 7d, the ring member 6 is also turned counterclockwise, as shown in FIG. 7f to bring the contact 6b into contact with the longer elastic plate 8b' of the stopper 8'. Thereafter, the contact 6b is held in the contacted position with the plates 8a' and 8b' being held contacted with each other until the steering wheel 4 is so rotated as to engage the projection 2c with the bearing member 6a, and to push the elastic plate 8b' apart from the plate 8a', as shown in FIG. 7g. Thereafter, a further rotation of the steering wheel 4 causes the engaging projection 2c to slide over the bearing member 6a to bring the steering wheel 4 and the ring member 6 to the initial position, as shown in FIG. 7h.

A similar operation is carried out when making a left turn of the automobile.

As is understood from the foregoing description, the stopper, e.g., 10' constituting a normally closed switch is so actuated as to be opened not when the steering wheel 4 is rotated β, but when rotated more than β, for example, about 135° in the above example.

Figure 8:
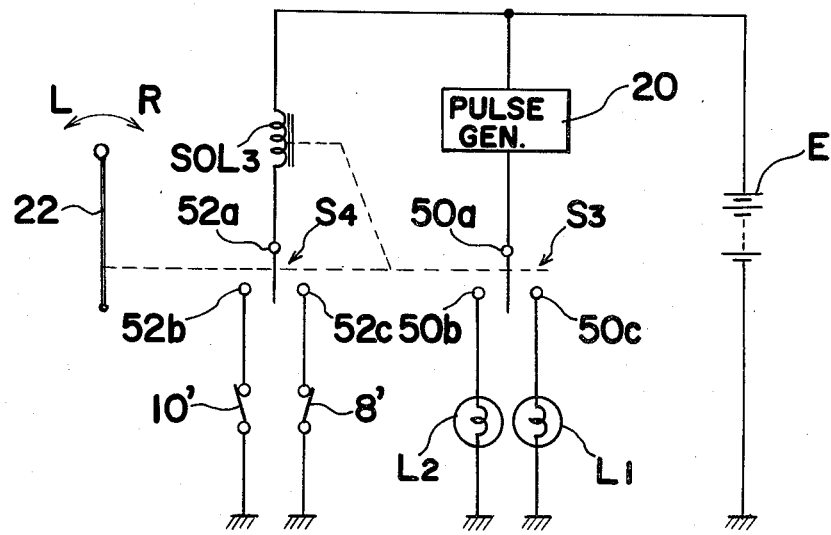
FIG. 8 is a circuit diagram of an electrical portion of a turn indicator system according to the second embodiment of the present invention.

Referring to FIG. 8, there is shown a circuit diagram for the electrical portion of the turn indicator system of the second embodiment. The electrical portion comprises switches S3 and S4 and a solenoid SOL3. The switch S3 includes a terminal 50a connected through the pulse generator 20 to the power source E, and terminals 50b and 50c connected, respectively, to the left and right turn indicator lamps L2 and L1, which are in turn connected to ground. The switch S4 includes a terminal 52a connected through the solenoid SOL3 to the power source E, and terminals 52b and 52c connected, respectively, to the normally closed switches 10' and 8' which are in turn connected to ground. The normally closed switches 10' and 8' are constituted by the stoppers 10' and 8'. The switches S3 and S4 are normally held in a neutral position as shown in FIG. 8 and are provided in association with the turn indicator lever 22 and coupled with the solenoid SOL3. The operation of the circuit is explained below.

When the turn indicator lever 22 is tilted, for example, rightwardly, the switches S3 and S4 are so actuated that the terminal 50a is connected with the terminal 50c and the terminal 52a is connected with the terminal 52c. By the connection between the terminals 50a and 50c of the switch S3, the turn indicator lamp L1 starts to blink by the pulse signal obtained from the pulse generator 20, and by the connection between the terminals 52a and 52c of the switch S4, the solenoid SOL3 is energized to maintain the switches S3 and S4 in the above mentioned connected position. Thereafter, when the automobile makes the right turn, the switch 10' opens in the above described manner. In this case, since the terminal 52b connected with the switch 10' is not connected with the terminal 52a, no operation takes place by the opening of the switch 10'. Then, after the completion of right turn of the automobile, the steering wheel 4 is rotated counterclockwise to open the switch 8' in the above described manner, resulting in de-energization of the solenoid SOL3. Accordingly, the switches S3 and S4 are returned to their neutral position to stop the indicator lamp L1 from blinking.

According to the second embodiment of the present invention, since the switch 8' or 10' is actuated after a considerable rotation of the steering wheel 4, the turn indicator lamp will not be canceled by a slight rotation of the steering wheel 4 in the counterindicated direction.

It is to be noted that the mechanical portion of the turn indicator system of the first or second embodiment can be provided on the steering wheel shaft 2 remote from the steering wheel 4, as shown in FIGS. 9 and 10. When this arrangement is employed, a space directly under the steering wheel 4 can be cleared to install other control arrangements, such as, control arrangements for controlling window wipers, various lights, etc.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. In an automobile having first and second turn indicators which are actuated one at a time by a manually operable actuator means, and a turn indicator system for cancelling the actuated one of the first and second turn indicators when a steering wheel shaft of the automobile which has been rotated in one direction from its neutral position is returned towards the neutral position, said turn indicator system comprising:

a plate member rotatably mounted on, and frictionally engaged to, said steering wheel shaft to cause said plate member to rotate together with said steering wheel shaft;

a contact member rigidly connected to said plate member;

first and second stop members disposed around said steering wheel shaft and spaced a predetermined angle from each other about a longitudinal axis of said steering wheel shaft, said contact member adapted to come into contact with said first and second stop members when said steering wheel is rotated in first and second directions, respectively, said contact member, when forced into contact with any one of the first and second stop members depending on the direction of rotation of the steering wheel shaft, being held motionless in engagement with the corresponding stop member while permitting the continued rotation of the steering wheel shaft;

first and second switch means operatively associated with said first and second stop members, respectively, such that said first and second switch means are actuated by said contact member; and means for cancelling said first and second turn indicators by the actuation of said second and first switch means, respectively.

2. In an automobile having first and second turn indicators which are actuated one at a time by a manually operable actuator means, and a turn indicator system for cancelling the actuated one of the first and second turn indicators when a steering wheel shaft of the automobile which has been rotated in one direction from its neutral position is returned towards the neutral position, said turn indicator system comprising:

a plate member rotatably mounted on, and frictionally engaged to, said steering wheel shaft to cause said plate member to rotate together with said steering wheel shaft;

a contact member rigidly connected to said plate member;

first and second stop members disposed around said steering wheel shaft and spaced a predetermined angle from each other about a longitudinal axis of said steering wheel shaft, said contact member adapted to come into contact with said first and second stop members when said steering wheel is rotated in first and second directions, respectively, said contact member, when forced into contact with any one of the first and second stop members depending on the direction of rotation of the steering wheel shaft, being held motionless in engagement with the corresponding stop member while permitting the continued rotation of the steering wheel shaft;

first and second switch means operatively associated with said first and second stop members, respectively, such that said first and second switch means are actuated when said contact member comes into contact with said first and second stop members, respectively; and an electrical circuit means coupled to said first and second switch means for cancelling said first turn indicator when said second switch means is actuated after at least one actuation of said first switch means, and for cancelling the second turn indicator when said first switch means is actuated after at least one actuation of the second switch means.

3. A turn indicator system as claimed in claim 2, wherein each of said first and second switch means is a normally opened switch and is closed when actuated.

4. A turn indicator system as claimed in claim 2, wherein said electrical circuit means comprises a logic circuit which produces a cancellation signal for the first turn indicator when said first and second switch means are actuated in said order, and produces a cancellation signal for the second turn indicator when said second and first switch means are actuated in said order.

5. A turn indicator system as claimed in claim 2, wherein said plate member is provided adjacent to a steering wheel mounted on said steering wheel shaft.

6. A turn indicator system as claimed in claim 2, wherein said plate member is provided remote from a steering wheel mounted on said steering wheel shaft.

7. In an automobile having first and second turn indicators which are actuated one at a time by a manually operable actuator means, and a turn indicator system for cancelling the actuated one of the first and second turn indicators when a steering wheel shaft of the automobile which has been rotated in one direction from its neutral position is turned towards the neutral position, said turn indicator system comprising:

a plate member rotatably mounted on, and frictionally engaged to, said steering wheel shaft to cause said plate member to rotate together with said steering wheel shaft;

a contact member rigidly connected to said plate member;

first and second stop members disposed around said steering shaft and spaced a predetermined angle from each other about a longitudinal axis of said steering wheel shaft, said contact member adapted to come into contact with said first and second stop members when said steering wheel is rotated in first and second directions, respectively, said contact member, when forced into contact with any one of the first and second stop members depending on the direction of rotation of the steering wheel shaft, being held motionless in engagement with the corresponding stop member while permitting the continued rotation of the steering wheel shaft;

at least one engaging member provided on said steering wheel shaft;

at least one engageable member provided on said plate member, said engaging member adapted to engage with said engageable member when said steering wheel shaft is rotated while said contact member is held motionless in engagement with the corresponding stop member for applying an additional rotating force to said plate member, said engaging member capable of being disengaged from and moved past, said engageable member, when said steering wheel shaft is forced to rotate, to permit the continued rotation of the steering wheel shaft;

first and second switch means operatively associated with said first and second stop members, respectively, such that said first and second switch means are actuated when said engaging means applies said additional rotating force to said plate member while said contact member is held motionless in engagement with the corresponding stop member; and an electrical circuit means coupled to said first and second switch means for cancelling said first and second turn indicators when said second and first switch means, respectively, are actuated.

8. A turn indicator system as claimed in claim 7, wherein said steering wheel shaft is provided with two engaging members spaced 180 degrees from each other about said longitudinal axis of said steering wheel shaft, and wherein said plate member is provided with two engageable members spaced 180 degrees from each other about said longitudinal axis.

9. A turn indicator system as claimed in claim 8, wherein each of said first and second switch means is a normally closed switch and is opened when actuated.

10. A turn indicator system as claimed in claim 7, wherein said plate member is provided adjacent to a steering wheel mounted on said steering wheel shaft.

11. A turn indicator system as claimed in claim 7, wherein said plate member is provided remote from a steering wheel mounted on said steering wheel shaft.

* * * * *